US010873071B2

(12) United States Patent
Kim et al.

(10) Patent No.: US 10,873,071 B2
(45) Date of Patent: Dec. 22, 2020

(54) SILICON-BASED NEGATIVE ELECTRODE ACTIVE MATERIAL AND METHOD FOR PREPARING THE SAME

(71) Applicant: LG Chem, Ltd., Seoul (KR)

(72) Inventors: Hyun Chul Kim, Daejeon (KR); Yong Ju Lee, Daejeon (KR); Yoon Ah Kang, Daejeon (KR); Eun Kyung Kim, Daejeon (KR)

(73) Assignee: LG Chem, Ltd.

( * ) Notice: Subject to any disclaimer, the term of this patent is extended or adjusted under 35 U.S.C. 154(b) by 258 days.

(21) Appl. No.: 15/521,532

(22) PCT Filed: Nov. 27, 2015

(86) PCT No.: PCT/KR2015/012815
§ 371 (c)(1),
(2) Date: Apr. 24, 2017

(87) PCT Pub. No.: WO2016/085282
PCT Pub. Date: Jun. 2, 2016

(65) Prior Publication Data
US 2017/0309893 A1    Oct. 26, 2017

(30) Foreign Application Priority Data

Nov. 27, 2014  (KR) .................. 10-2014-0167760
Nov. 27, 2015  (KR) .................. 10-2015-0166965

(51) Int. Cl.
*H01B 1/04* (2006.01)
*H01M 4/00* (2006.01)
*H01M 4/133* (2010.01)
*C08L 1/28* (2006.01)
*H01M 4/48* (2010.01)
*H01M 4/62* (2006.01)
*H01M 4/36* (2006.01)
*H01M 4/38* (2006.01)
*C08B 3/06* (2006.01)
*C08F 20/44* (2006.01)
*H01M 4/134* (2010.01)
*H01M 10/0525* (2010.01)

(52) U.S. Cl.
CPC ............ *H01M 4/133* (2013.01); *C08B 3/06* (2013.01); *C08F 20/44* (2013.01); *C08L 1/286* (2013.01); *H01M 4/134* (2013.01); *H01M 4/366* (2013.01); *H01M 4/386* (2013.01); *H01M 4/483* (2013.01); *H01M 4/621* (2013.01); *H01M 10/0525* (2013.01)

(58) Field of Classification Search
CPC .. H01B 1/00; H01B 1/04; H01B 1/24; H01M 4/38; H01M 4/48; H01M 4/587; H01M 4/62
See application file for complete search history.

(56) References Cited

U.S. PATENT DOCUMENTS 5,182,016 A * 1/1993 Funkenbusch ........... B01J 20/06
210/198.2
9,966,594 B2 * 5/2018 Kim ........................ B82Y 30/00
2003/0118905 A1 * 6/2003 Fukuoka ................. C09C 1/3045
429/218.1
2003/0215711 A1 * 11/2003 Aramata ................. B82Y 30/00
429/218.1
2009/0130562 A1 * 5/2009 Mao ........................ C25D 17/10
429/231.8
2013/0004846 A1   1/2013 Kim et al.
2013/0196844 A1 * 8/2013 Keller ................... C04B 35/522
501/90
2014/0170485 A1 * 6/2014 Lee ......................... H01M 4/139
429/211
2017/0117538 A1 * 4/2017 Bendimerad ......... H01M 4/366
2018/0123124 A1 * 5/2018 Yang ..................... H01M 4/366
2018/0151868 A1 * 5/2018 Kim ...................... H01M 4/382
2018/0151874 A1 * 5/2018 Kim ...................... H01M 4/134

FOREIGN PATENT DOCUMENTS

| KR | 20090058505 A | 6/2009 |
| KR | 20130004536 A | 1/2013 |
| KR | 20130016727 A | 2/2013 |
| KR | 20130071071 A | 6/2013 |
| KR | 20140112451 A | 9/2014 |

OTHER PUBLICATIONS

Cakan et al "Hydrothermal carbon spheres containing silicon nanoparticles; synthesis and lithium storage performance", Chem. Commun., 2008, 3759-3761.*
Bae "Fabrication of carbon microcapsules containing silicon nanoparticles-carbon nanotubes nanocomposite by sol-gel method . . . ", Journal of Solid State Chemistry 184 (2011) 1749-1755.*
Wang et al "Silicon/carbon nanocomposite pyrolyzed from phenolic resin as anode materials for lithium-ion batteries", Journal of Power Sources 244 (2013) 570-574.*
Gao et al "Microporous carbon coated silicon core/shell nanocomposite via in situ polymerization for advanced Li-ion battery anode material", Phys. Chem. Chem. Phys., 2009, 11, 11101-11105.*
International Search Report from PCT/KR2015/012815 dated Apr. 8. 2016.
Guo et al., "A polymer scaffold binder structure for high capacity silicon anode of lithium-ion battery", Chem Comm., Jan. 2010, vol. 46, pp. 1428-1430.

* cited by examiner

*Primary Examiner* — Mark Kopec
(74) *Attorney, Agent, or Firm* — Lerner, David, Littenberg, Krumholz & Mentlik, LLP

(57) ABSTRACT

A negative electrode active material of the present invention includes a core containing silicon-based nanoparticles and polymer carbides distributed on the nanoparticles, wherein the core has a size of 30-300 nm, and such a negative electrode active material is prepared using a method including dispersing a suspension in which silicon-based nanoparticles and water-soluble polymer are added to a solvent using ultrasonic waves; and preparing a core including the silicon-based nanoparticles having the polymer carbides on the surface by carbonizing the water-soluble polymer. As a result, a negative electrode active material having a significantly low volume expansion rate compared with general non-carbon-based negative electrode active materials, and having excellent electric conductivity may be provided.

9 Claims, No Drawings

SILICON-BASED NEGATIVE ELECTRODE ACTIVE MATERIAL AND METHOD FOR PREPARING THE SAME

CROSS-REFERENCE TO RELATED APPLICATIONS

The present application is a national phase entry under 35 U.S.C. § 371 of International Application No. PCT/KR2015/012815, filed Nov. 27, 2015, which claims priority to and the benefits of Korean Patent Application No. 10-2014-0167760, filed with the Korean Intellectual Property Office on Nov. 27, 2014, and Korean Patent Application No. 10-2015-0166965, filed with the Korean Intellectual Property Office on Nov. 27, 2015, the entire contents of which are incorporated herein by reference.

FIELD OF THE INVENTION

The present invention relates to a negative electrode active material including silicon-based nanoparticles having polymer carbides distributed on the surface, and a method for preparing the same.

DESCRIPTION OF THE RELATED ART

With increases in technology developments and demands for mobile devices, demands for secondary batteries as an energy source have rapidly increased, and among such secondary batteries, lithium secondary batteries having high energy density and voltage have been commercialized and widely used.

As a positive electrode active material of a lithium secondary battery, lithium metal oxides have been used, and as a negative electrode active material, lithium metal, lithium alloys, crystalline or non-crystalline carbon or carbon complexes have been used. A secondary battery is manufactured by applying the active material on a collector to proper thickness and length or applying the active material itself in a film form, and winding or laminating the result with a separator, an insulator, to form an electrode group, then placing the result in a can or a container similar thereto, and then injecting an electrolyte thereto.

Graphite has been normally used as a negative electrode material of a lithium secondary battery, however, graphite has small capacity per unit mass of 372 mAh/g, and therefore, a lithium secondary battery having high capacity is difficult to be manufactured.

As a negative electrode material having higher capacity than graphite, materials forming a compound between metals with lithium, such as silicon, tin and oxides thereof, are promising. However, these materials have a problem in causing changes in the crystal structure when absorbing and storing lithium, which leads to volume expansion.

Silicon-based materials that have recently been studied as a high capacity material have high capacity of approximately 3600 mAh/g, approximately at least 10 times larger than theoretical capacity of carbon-based materials, and have received attention as a high capacity secondary battery material.

Silicon is converted to $Li_{4.4}Si$ when absorbing and storing a maximum amount of lithium leading to volume expansion due to charge, and in this case, a volume increase rate from the charge may be up to 4.12 times compared to the volume of silicon prior to volume expansion, which leads to a problem of the occurrence of cracks between particles and lifespan property decline due to short circuit between electrodes.

In order to improve such phenomena, studies using nano-size level particles as silicon particles or allowing silicon to have porosity and thereby have a buffering effect for volume changes have been progressed, however, in the case of nanoparticles, aggregation between the nanoparticles severely occurs, which is not advantageous in improving a lifespan property, and there are also problems in that the aggregated nanoparticles have low conductivity, and battery performance is not properly obtained.

DISCLOSURE OF THE INVENTION

Technical Problem

An object of the present invention is to provide a non-carbon-based negative electrode active material capable of enhancing electric conductivity and controlling volume expansion by distributing polymer carbides on the surface of silicon-based nanoparticles in order to provide a silicon-based negative electrode active material having theoretical capacity closer to 10 times larger than carbon-based negative electrode active materials.

Technical Solution

In view of the above, one embodiment of the present invention provides a negative electrode active material including silicon-based nanoparticles; and water-soluble polymer carbides distributed on the nanoparticles, wherein sizes of the silicon-based nanoparticle having the polymer carbides distributed on the surface has a diameter in the range of 30 nm to 800 nm.

The silicon-based nanoparticles may be any one material selected from the group consisting of Si, SiO, SiM and a combination thereof, and M is any one selected from the group consisting of Ni, Co, B, Cr, Cu, Fe, Mn, Ti, Y and a combination thereof.

The water-soluble polymer may include any one selected from the group consisting of carboxymethylcellulose (CMC), sucrose, polyacrylonitrile (PAN) and a combination thereof.

The water-soluble polymer may have a weight average molecular weight of 90,000 to 2,000,000.

The negative electrode active material may include 3% by weight to 20% by weigh of polymer carbides with respect to the total weight of the silicon-based nanoparticles.

Another embodiment of the present invention provides a method for preparing a negative electrode active material including dispersing suspension, in which silicon-based nanoparticles and a water-soluble polymer are added to a solvent, using ultrasonic waves; and forming polymer carbides on a surface of the silicon-based nanoparticles by carbonizing the water-soluble polymer.

The carbonization may be carried out in a two-step process including a low-temperature carbonization process and a high-temperature carbonization process.

The low-temperature carbonization process may be carried out using a spray drying apparatus, and may include injecting the suspension into a chamber inside a spray drying apparatus, and spray drying the suspension in the chamber.

The low-temperature carbonization process may be carried out at a temperature of 80° C. to 300° C.

The high-temperature carbonization process may be heat treatment carried out at a temperature of 800° C. to 1100° C.

Advantageous Effects

A method for preparing a negative electrode active material of the present invention is capable of readily dispersing nano-sized silicon-based particles using ultrasonic waves and, by distributing polymer carbides on a surface of the silicon-based nanoparticles using a simple method such as spray drying, is capable of preventing aggregation of nanoparticles, securing conductivity, and providing additional conductivity by forming a shell layer with a water-soluble polymer. As a result, a negative electrode active material having a significantly lower volume expansion rate compared to general non-carbon-based negative electrode active materials and having excellent electric conductivity is capable of being provided.

MODE FOR CARRYING OUT THE INVENTION

Hereinafter, the present invention will be described in more detail in order to illuminate the present invention. Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

A method for preparing a negative electrode active material according to one embodiment of the present invention includes dispersing suspension, in which silicon-based nanoparticles and a water-soluble polymer are added to a solvent, using ultrasonic waves; and forming polymer carbides on a surface of the silicon-based nanoparticles by carbonizing the water-soluble polymer.

The preparation and dispersion of the suspension may include preparing suspension by adding silicon-based nanoparticles and a water-soluble polymer to a solvent, and dispersing nanoparticles having an aggregating property by irradiating ultrasonic waves on this suspension to vibrate particles in the suspension.

The solvent is not particularly limited as long as it readily evaporates in the carbonization process carried out thereafter, and does not react with the water-soluble polymer, and for example, water such as deionized water and distilled water, and organic solvents having small number of carbon atoms such as ether and acetone may be used.

The silicon-based nanoparticles may be nanoparticles of silicon compounds, or nanoparticles having an oxidized film formed on the surface. For example, particles formed with single silicon elements, silicon oxides, silicon nitrides, compounds of silicon and metals and the like may be included, and specifically, Si, SiO, SiM or a mixture thereof may be used. In SiM, M may be Ni, Co, B, Cr, Cu, Fe, Mn, Ti, Y or a combination thereof, and those alloying Si and powder of M using a mechanical alloying method, however, particles formed with single silicon elements may be preferable as a negative electrode active material so that lithium ions are readily absorbed and released.

The water-soluble polymer may be used without limit as long as it is favorably dispersed into an aqueous solvent used, and examples thereof may include a cellulose-based polymer, and may be a polymer including a nitrile group. Examples of the cellulose-based polymer may include carboxymethylcellulose (CMC), sucrose or a mixture thereof, and examples of the polymer including a nitrile group may include polyacrylonitrile (PAN) and the like, and using a water-soluble polymer including a functional group such as a carboxyl group or a nitrile group is preferable since such a functional group that is readily oxidized is also readily carbonized.

The water-soluble polymer may have a weight average molecular weight of 90,000 to 2,000,000, and for example, greater than or equal to 1,400,000 and less than or equal to 1,800,000, and most preferably 90,000 to 700,000. The water-soluble polymer having a molecular weight of less than 90,000 may be advantageous in terms of solubility, but is disadvantageous in terms of securing conductivity due to a small carbonized amount, and may be disadvantageous in terms of economic feasibility and processibility since an excess amount needs to be introduced, and when the molecular weight is greater than 2,000,000, dispersibility of the silicon-based nanoparticles is reduced causing uniformity decline of the carbides located on the surface.

As the content of the silicon-based nanoparticles and the water-soluble polymer added to the solvent, adding these considering the relative ratio may be preferable, and the content of the silicon-based nanoparticles and the water-soluble polymer needs to be adjusted considering both sides such that the silicon-based nanoparticles and the water-soluble polymer form a film structure completely covering the outside such as a coating layer due to the excess amount of the polymer carbides formed on the surface of the silicon-based nanoparticles, which may prevent lithium ion absorption and release into the silicon crystal structure, a low electric conductivity problem due to too small amount of the polymer carbides on the surface of the silicon-based nanoparticles, a problem of suppressing volume expansion or an effect of preventing aggregation.

The silicon-based nanoparticles and the water-soluble polymer need to present in a uniformly dispersed state in the suspension. When these are not uniformly dispersed, the water-soluble polymer may be distributed on some of the particles instead of being distributed on the surface of all the silicon-based nanoparticles when carbonized, and consequently, a problem of electric conductivity or volume expansion that silicon-based negative electrode active materials have may not be settled.

Accordingly, the suspension needs to be uniformly dispersed, and ultrasonic waves may be used as a method for this uniform dispersion, and by irradiating ultrasonic waves, distances between particles in the suspension may increase as the particles vibrate due to energy caused by ultrasonic waves, and uniform dispersion may be obtained therefrom.

A frequency of the ultrasonic waves may be properly adjusted, and the frequency may be adjusted considering an aspect of dispersibility of the silicon-based nanoparticles and the water-soluble polymer, and an aspect of concern for deformation or reaction of the silicon-based nanoparticles or the water-soluble polymer due to high energy.

A two-step carbonization process may be carried out as a method of dispersing the suspension, and carbonizing the water-soluble polymer on the silicon-based nanoparticles, and the two-step carbonization process may include a low-temperature carbonization process and a high-temperature carbonization process.

The low-temperature carbonization process may use a method using a spray drying apparatus, and carbonization of the water-soluble polymer using the spray drying apparatus may include injecting the suspension into a chamber in the spray drying apparatus, and drying the suspension while spraying the suspension in the chamber.

Examples of the spray drying apparatus capable of being used in such a spray drying process may include an ultrasonic wave spray drying apparatus, an air nozzle spray drying apparatus, an ultrasonic wave nozzle spray drying apparatus, a filter expansion aerosol generator, an electrostatic spray drying apparatus or a combination thereof.

Specifically, the suspension in which the silicon-based nanoparticles and the water-soluble polymer are uniformly dispersed is injected into a chamber provided in a spray drying apparatus, and by drying the suspension while spraying the suspension in the chamber, a core containing silicon-based nanoparticles having a water-soluble polymer carbonized on the surface may be formed.

The low temperature carbonization carried out through the spray drying method may be carried out at a temperature of 80° C. to 300° C. When the temperature of the spray drying is lower than 80° C., moisture may remain in the particles, and when the temperature is higher than 300° C., particle growth may occur due to the aggregation of the nanoparticles. Accordingly, proper temperature adjustment is required, and adjusting the temperature to approximately 100° C. to 200° C. is preferable.

The high-temperature carbonization process may be carried out by placing the Si material produced through the spray drying method in a furnace, and heat treating the Si material under inert atmosphere. Herein, the heat treatment temperature may be from 800° C. to 1100° C., and when the heat treatment temperature is lower than 800° C., the degree of graphitization is low causing concern for electric conductivity decline, and when the heat treatment temperature is higher than 1100° C., nano Si crystals grow causing problems such as lifespan property decline and/or occurrence of electrode swelling due to crystal grain coarsening.

Such a silicon-based active material has an advantage of having theoretical capacity closer to 10 times larger than carbon-based active materials among negative electrode active materials, but on the contrary, exhibits a volume expansion rate closer to 4 times higher than carbon-based active materials after lithium ions are initially absorbed once and then released. Therefore, in order to use a silicon-based active material, the silicon-based active material needs to be used as nanoparticles greatly decreasing the scale.

Meanwhile, nanoparticles have a property to aggregate due to their intrinsically high surface energy, and preparing the nanoparticles to active material particles is difficult due to such an aggregating property, and as a result, commercialization of a silicon-based active material has been difficult.

However, the method for preparing a negative electrode active material according to one embodiment of the present invention disperses silicon-based nanoparticles through ultrasonic waves, and carbonizes a water-soluble polymer on the surface of the silicon-based nanoparticles, and therefore, a core containing the silicon-based nanoparticles having the prepared polymer carbides formed on the surface is capable of preventing aggregation of the nanoparticles, and at the same time, is capable of resolving a problem of low electric conductivity of a silicon-based active material.

When a negative electrode active material is prepared generally considering the effects described above, the content of the polymer carbides may be approximately from 3% by weight to 20% by weight with respect to the total weight of the silicon-based nanoparticles. In other words, controlling the ratio of the polymer carbides with respect to the total weight of the silicon-based nanoparticles by properly adjusting various process conditions, content ratios and the like may be important.

The silicon-based nanoparticles having the polymer carbides, a carbonized water-soluble polymer, distributed on the surface may be used for a negative electrode active material by itself, however, a carbon coating layer containing a water-soluble polymer so as to cover the outside of the prepared negative electrode active material may be further formed after the carbonization in order to secure conductivity and the like.

The carbon coating layer may include a conductive material, and may remedy low electric conductivity, a disadvantage of silicon-based active materials together with the polymer carbides distributed on the surface of the silicon-based nanoparticles, and is also capable of improving a lifespan property of a lithium secondary battery provided with such an active material.

The carbon coating layer may use general methods of particle coating, and may be formed using a chemical method or a mechanical method.

The carbon coating layer may be formed by mixing the core powder and the water-soluble polymer power, and coating the result using a mechanical method, and milling and the like may be used as an example of the mechanical method. Using a milling process is advantageous in terms of costs, process operation and the like in industrial size production.

The carbon coating layer may be formed using a physicochemical method such as a chemical vapor deposition method, and the coating layer may be formed from deposition on the core using a water-soluble polymer precursor.

In addition, the carbon coating layer may be formed by dispersing a precursor of a material forming the carbon coating layer in a solvent such as tetrahydrofuran (THF), alcohol and the like, mixing the result with the silicon-based negative electrode active material, and then drying and heat treating the result. The heat treatment temperature may be, for example, from 300° C. to 1400° C., and the coating may be carried out by heat treatment in this temperature range.

Examples of the precursor of a material forming the carbon coating layer may include a pitch, a hydrocarbon-based material or the like. Examples of the hydrocarbon-based material may include furfuryl alcohol, a phenol-based resin or the like.

Accordingly, in forming the carbon coating layer on a negative electrode active material containing the silicon-based nanoparticles and the polymer carbides, a mechanical method, a physicochemical method or a heat treatment method may be property selected considering advantages and disadvantages of the each method depending on the need.

However, electric conductivity that may be enhanced by such a carbon coating layer may be sufficiently accomplished just with the polymer carbides distributed on the surface of the silicon-based nanoparticles sometimes, and in this case, the carbon coating layer may not be necessary. Accordingly, cases of properly forming or not forming the carbon coating layer may coexist depending on the physical properties of the prepared silicon-based negative electrode active material.

A negative electrode active material according to another embodiment of the present invention includes silicon-based nanoparticles, and water-soluble polymer carbides distributed on the nanoparticles.

The core may have a size of 30 nm to 800 nm, and may preferably have a size of 50 nm to 300 nm, or 50 nm to 100 nm. When the core size is less than 30 nm, aggregation of the nanoparticles may not be controlled even with carbonization and shell layer formation due to high surface energy, and when the core size is greater than 800 nm, volume expansion of a finally manufactured battery may be caused.

All descriptions relating to the silicon-based nanoparticles such as types of the silicon-based nanoparticles and formation of an external oxide film, all descriptions relating to the water-soluble polymer, all descriptions relating to the core, and all descriptions relating to the shell such as types of the water-soluble polymer, presence and non-presence of the shell, the thickness and the weight ratio are not repeated since these descriptions are overlapped with the descriptions made in the method for preparing the negative electrode active material.

A negative electrode for a lithium secondary battery according to still another embodiment of the present invention may include negative electrode slurry including the negative electrode active material described above, a binder and a solvent and selectively including a conductor and a viscosity agent, and a negative electrode collector on which this negative electrode slurry is applied.

In addition, using the negative electrode, the present invention provides a lithium secondary battery including a positive electrode including positive electrode slurry that includes a positive electrode active material, a binder and a solvent and selectively includes a conductor and a viscosity agent, and a positive electrode collector on which this positive electrode slurry is applied, a separator provided between the positive electrode and the negative electrode, and an electrolyte including a lithium salt, additives and a non-aqueous solvent.

The binder is not particularly limited in the use as long as it is a binder generally used in the art, and examples thereof may include polyvinylidene fluoride (PVDF), a copolymer of polyhexafluoropropylene-polyvinylidene fluoride (PVdF/HFP), polyvinyl acetate), polyvinyl alcohol, polyethylene oxide, polyvinylpyrrolidone, alkylated polyethylene oxide, polyvinyl ether, poly(methyl methacrylate), poly(ethyl acrylate), polytetrafluoroethylene (PTFE), polyvinyl chloride, polyacrylonitrile, polyvinylpyridine, styrene-butadiene rubber, acrylonitrile-butadiene rubber, an ethylene-propylene-diene monomer (EPDM), a mixture thereof, or the like.

The conductor may be included for enhancing conductivity, and the conductor may be any one selected from the group consisting of natural graphite, artificial graphite, carbon black, acetylene black, Ketjen black, channel black, furnace black, lamp black, thermal black, carbon nanotubes, fullerene, carbon fiber, metal fiber, fluorocarbon, aluminum, nickel powder, zinc oxide, potassium titanate, titanium oxide and polyphenylene derivatives, or a mixture of two or more types of these, and may preferably be carbon black.

The negative electrode may include a viscosity agent for adjusting viscosity. The viscosity agent may be a cellulose-based material, and for example, any one selected from the group consisting of carboxymethylcellulose (CMC), hydroxymethylcellulose, hydroxyethylcellulose and hydroxypropyl cellulose, or a mixture of two or more types of these. The viscosity agent may preferably be carboxymethylcellulose (CMC), and carboxymethylcellulose may be dispersed together with the negative electrode active material and the binder to be used in the negative electrode.

The solvent for forming the negative electrode slurry includes water or an organic solvent such as N-methyl pyrrolidone (NMP), dimethylformamide (DMF), acetone, dimethylacetamide, and these solvents may be used either alone or as a mixture of two or more types.

The negative electrode may include a collector, and non-limiting examples of the negative electrode collector include copper, gold, nickel, copper alloys, foil prepared from a combination thereof, or the like.

The lithium secondary battery according to one embodiment of the present invention may include all common lithium secondary batteries such as a lithium metal secondary battery, a lithium ion secondary battery, a lithium polymer secondary battery or a lithium ion polymer secondary battery.

The lithium secondary battery of the present invention may be manufactured following common methods known in the art. For example, the lithium secondary battery of the present invention may be manufactured by placing a porous separator between a positive electrode and a negative electrode, and injecting an electrolyte dissolving a lithium salt thereto.

The positive electrode may be manufactured using common methods known in the art. For example, slurry is prepared by mixing a solvent, and as necessary, a binder, a conductor, and a dispersing agent to a positive electrode active material and stirring the result, and the positive electrode may be manufactured by applying (coating) the slurry on a collector made of a metal material, and compressing and then drying the result.

The positive electrode may be manufactured by applying the positive electrode slurry on the positive electrode collector, and then drying the result. Herein, a lithium-containing transition metal oxide may be preferably used as the positive electrode active material, and examples thereof may include any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $LixCo_{1-y}Mn_yO_2$ ($0.5<x<1.3$, $0\leq y<1$), $Li_xNi_{1-y}Mn_yO_2$ ($0.5<x<1.3$, $0\leq y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or a mixture of two or more types of these, and the lithium-containing transition metal oxide may be coated with a metal such as aluminum (Al) or with a metal oxide. In addition to the lithium-containing transition metal oxide, a sulfide, a selenide, a halide and the like of the lithium-containing transition metal may also be used.

The collector made of a metal material is a metal having high conductivity, and is not limited as long as it is a metal to which the electrode active material slurry readily adheres, and having no reactivity in a battery voltage range. Non-limiting examples of the positive electrode collector include aluminum, nickel, foil prepared from a combination thereof, or the like.

The solvent for forming the positive electrode includes water or an organic solvent such as N-methyl pyrrolidone (NMP), dimethylformamide (DMF), acetone, dimethylacetamide, and these solvents may be used either alone or as a mixture of two or more types The amount of the solvent used is sufficient as long as the solvent is capable of dissolving and dispersing the electrode active material, the binder and the conductor considering an application thickness of the slurry and a manufacturing yield.

In addition, common porous polymer films that have been used as a separator may be used as the separator, and for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer may be used either alone, or as a laminate thereof, or common porous non-woven fabrics, for example, non-woven fabrics made of high melting point glass fiber or polyethylene terephthalate fiber may be used, however, the separator is not limited thereto.

As a lithium salt that may be included as the electrolyte, those commonly used in an electrolyte for a lithium secondary battery may be used without limit, and examples of an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may include an organic-based liquid electrolyte, an inorganic-based liquid electrolyte, a solid polymer electrolyte, a gel-type polymer electrolyte, a solid inorganic electrolyte, a molten inorganic electrolyte and the like capable of being used in the manufacture of a lithium secondary battery, but is not limited thereto.

An appearance of the lithium secondary battery is not particularly limited, but may include a cylinder-type, a square-type, a pouch-type or a coin-type using a can.

The lithium secondary battery of the present invention may be used as a power supply of various electronic products. Examples thereof may include portable phones, mobile phones, game consoles, portable televisions, laptops, calculators and the like, but are not limited thereto.

EXAMPLE

Hereinafter, examples of the present invention will be described in detail so that those skilled in the art readily carry out the invention. However, the present invention may be carried out in various different forms and is not limited to the examples described below.

Example 1

1) Preparation of Negative Electrode Active Material

Suspension was prepared by adding Si nanoparticles as silicon-based nanoparticles and carboxymethylcellulose (hereinafter, CMC) having a weight average molecular weight of approximately 100,000 as a water-soluble polymer to deionized water, and particle dispersion was induced while irradiating ultrasonic waves on the suspension using an ultrasonic wave irradiation device.

The prepared suspension was injected to a spray drying apparatus to carry out a spray drying process at a temperature of approximately 200° C. (low-temperature carbonization process), and a high-temperature carbonization process was carried out at approximately 1000° C., and as a result, silicon-based nanoparticles having polymer carbides formed on the surface was obtained.

2) Manufacture of Lithium Secondary Battery

Negative electrode slurry was prepared by mixing the core as a negative electrode active material, carbon black as a conductor, and SBR-based rubber as a binder to N-methyl-2-pyrrolidone (NMP), a solvent. The negative electrode slurry was applied on a copper (Cu) thin film having a thickness of 10 μm, a negative electrode collector, and the result was dried, and then roll pressed to manufacture a negative electrode.

A coin-type half cell (2016 R-type half cell) was manufactured in a helium-filled glove box using the negative electrode, a lithium counter electrode, a microporous polyethylene separator and an electrolyte. The electrolyte was prepared by dissolving 1 M $LiPF_6$ in a solvent mixing ethylene carbonate and dimethyl carbonate in a volume ratio of 50:50.

Example 2

A negative electrode active material and a lithium secondary battery were prepared in the same manner as in Example 1 except that the temperature of the second carbonization carried out after the spray drying process was set at 800° C.

Comparative Example 1

A negative electrode active material and a lithium secondary battery were prepared in the same manner as in Example 1 except that CMC having a weight average molecular weight of approximately 3,000,000 was used as the water-soluble polymer.

Comparative Example 2

A negative electrode active material and a lithium secondary battery were prepared in the same manner as in Example 1 except that heat treatment was carried out instead of the spray drying process, and the heat treatment temperature was 600° C.

Test Example 1: Evaluation on Battery Property Depending on Weight Average Molecular Weight of Water-Soluble Polymer In order to examine initial discharge capacity of the coin-type half cells manufactured in Example 1 and Comparative Example 1, the half-cell manufactured at 25° C. was charged and discharged once with 0.1 C at 0 V to 1.5 V to measure initial discharge capacity, initial charge capacity and Coulomb efficiency. In addition, after completing the first charge and discharge, a capacity retention rate (lifespan property) after charging and discharging the half cell manufactured at 25° C. for 50 times with 0.5 C at 0 V to 1.5 V was identified. The results of measuring initial discharge capacity, initial efficiency and a lifespan property measured using the above-mentioned method are shown in the following Table 1.

TABLE 1

| | Initial Discharge Capacity (mAh/g) | Initial Efficiency (%) | Lifespan Property (%) |
|---|---|---|---|
| Example 1 | 3000 | 86 | 40 |
| Comparative Example 1 | 3000 | 85 | 22 |

When referring to Table 1, it was identified that the lifespan property in Example 1 using low molecular weight CMC was quite superior compared to Comparative Example 1 using high molecular weight CMC. Furthermore, it was identified that, even when a low molecular weight was used, no performance loss in initial discharge capacity or efficiency was caused compared to the case using a high molecular weight, and consequently, it was identified that using low molecular weight CMC is advantageous compared to using high molecular weight CMC causing a dispersibility problem or a uniformity problem in carbonization.

Test Example 2: Evaluation on Battery Property Depending on Carbonization Temperature of Water-Soluble Polymer For the secondary batteries of Example 2 and Comparative Example 2, the performance was evaluated using the same method as in Test Example 1, and the results are shown in the following Table 2.

TABLE 2

|  | Initial Discharge Capacity (mAh/g) | Initial Efficiency (%) | Lifespan Property (%) |
| --- | --- | --- | --- |
| Example 1 | 3000 | 86 | 40 |
| Example 2 | 3000 | 86 | 40 |
| Comparative Example 2 | 2800 | 83 | 32 |

When referring to Table 2, it was identified that initial efficiency or a lifespan property as well as initial discharge capacity decline in Comparative Example 2 in which the high-temperature carbonization process temperature was 600° C. that is lower than 800° C., compared to Examples 1 and 2 in which both high-temperature carbonization process temperatures were 800° C. and 1000° C., respectively. Consequently, it was seen that when the high-temperature carbonization process temperature was from 800° C. to 1100° C., carbonization of the water-soluble polymer on the surface of the silicon-based nanoparticles was uniform in general, and performance was excellently exhibited.

Hereinbefore, preferred embodiments of the present invention have been described in detail, however, the scope of the present invention is not limited thereto, and various modifications and improvements made by those skilled in the art using the basic concept of the present invention claimed in the following claims are also included in the scope of the present invention.

What is claimed is:

1. A negative electrode active material comprising:
   silicon-based nanoparticles; and
   a carbonized water-soluble polymer on the silicon-based nanoparticle,
   wherein the silicon-based nanoparticle having the carbonized water-soluble polymer thereon has a diameter in the range of 30 nm to 800 nm,
   wherein the carbonized water-soluble polymer is included in 3% by weight to 20% by weight with respect to a total weight of the silicon-based nanoparticles,
   wherein the silicon-based nanoparticles include any one material selected from the group consisting of SiO, SiM and a combination thereof, and M includes any one selected from the group consisting of Ni, Co, B, Cr, Cu, Fe, Mn, Ti, Y and a combination thereof,
   wherein the carbonized water-soluble polymer is prepared by carbonizing a water-soluble polymer having a weight average molecular weight of 90,000 to 2,000,000,
   wherein the water-soluble polymer is carboxymethylcellulose (CMC).

2. The negative electrode active material of claim 1, wherein the silicon-based nanoparticles include an oxidized film on the surface.

3. A method for preparing the negative electrode active material of claim 1 comprising:
   dispersing a suspension in which the silicon-based nanoparticles and the water-soluble polymer are added to a solvent using ultrasonic waves; and
   forming the carbonized water-soluble polymer on the surface of the silicon-based nanoparticles by carbonizing the water-soluble polymer.

4. The method of claim 3, wherein the carbonization is carried out in a two-step process including a low-temperature carbonization process and a high-temperature carbonization process.

5. The method of claim 4, wherein the low-temperature carbonization process is carried out using a spray drying apparatus, and includes injecting the suspension into a chamber inside a spray drying apparatus, and spray drying the suspension in the chamber.

6. The method of claim 5, wherein the spray drying apparatus includes any one selected from the group consisting of an ultrasonic wave spray drying apparatus, an air nozzle spray drying apparatus, an ultrasonic wave nozzle spray drying apparatus, a filter expansion aerosol generator, an electrostatic spray drying apparatus and a combination thereof.

7. The method of claim 4, wherein the low-temperature carbonization process is carried out at a temperature of 80° C. to 300° C.

8. The method of claim 4, wherein the high-temperature carbonization process is heat treatment carried out at a temperature of 800° C. to 1100° C.

9. The method of claim 3, wherein the solvent includes any one selected from the group consisting of water, acetone and a combination thereof.

* * * * *